Dec. 4, 1928.
F. LOCKETT
1,694,128
CATTLE GUARD
Filed April 25, 1927
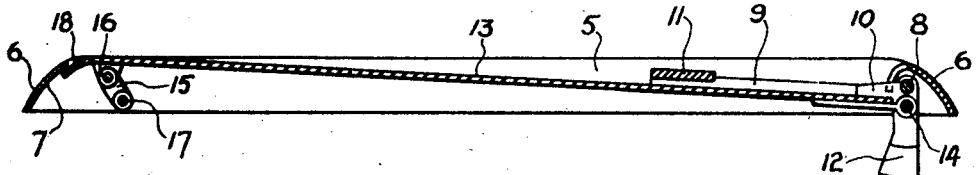
Fig. 1
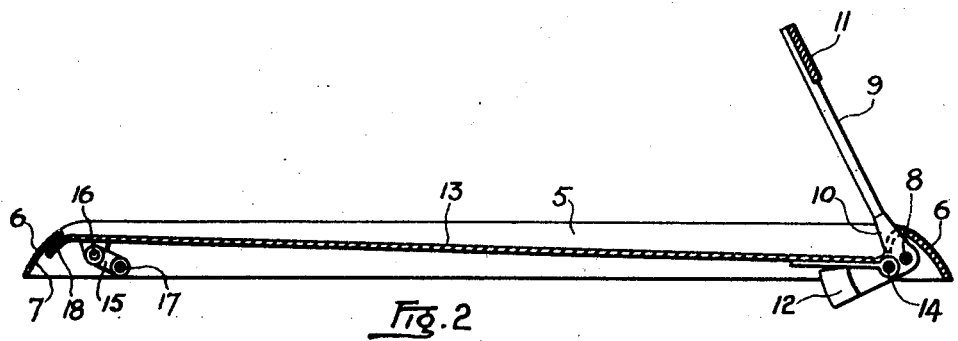
Fig. 2
Fig. 3
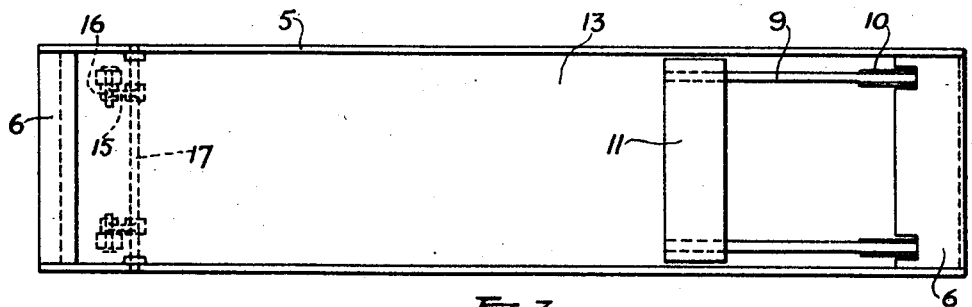
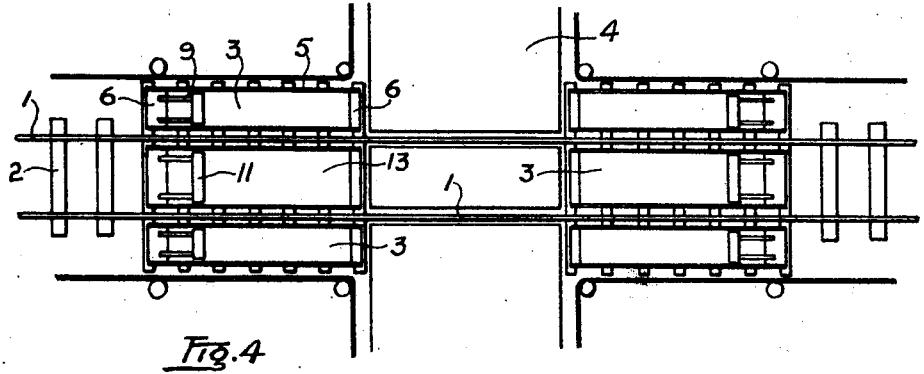
Fig. 4
INVENTOR
FRED LOCKETT
BY *Fetherstonhaugh & Co*
ATTORNEY Patented Dec. 4, 1928.

1,694,128

UNITED STATES PATENT OFFICE.

FRED LOCKETT, OF VANCOUVER, BRITISH COLUMBIA, CANADA.

CATTLE GUARD.

Application filed April 25, 1927, Serial No. 186,495, and in Canada May 25, 1926.

My invention relates to improvements in cattle guards, the objects of which are primarily to prevent animals from straying from a crossing onto the right of way, and in the event of an animal getting access thereto through a damaged fence or other point of entry, to permit him to pass outwards from the right of way onto the crossing and the road of which the crossing forms a part, and also to present no obstruction to rail traffic.

The invention consists essentially of the novel arrangement and construction of parts whereby the imposition of the weight of an animal or other body upon a platform will cause a gate to be raised thereacross to prevent such animal from entering the right of way of the railroad to which the device is fitted, as will be more fully described in the following specification, in which:—

Fig. 1 is a longitudinal sectional view showing gates in a lowered position.

Fig. 2 is a longitudinal sectional view showing gate in raised position.

Fig. 3 is a plan view.

Fig. 4 is a plan view of a crossing showing the preferred disposition of the cattle guards.

In the drawings like characters of reference indicate corresponding parts in each figure.

The numeral 1 indicates a pair of railway rails secured to ties 2 in the usual manner. The numeral 3 indicates generally a plurality of cattle guards positioned between the rails 1 on opposite sides of a railroad crossing 4, and on both sides of the tracks, to effectively prevent the encroachment of cattle onto the right of way. Each cattle guard is formed with a pair of side members 5 between the ends of which are end plates 6 having a raised arcuate inner edge 7. Adjacent the inner edge 7 of the plate 6 which is most remote from the crossing 4, is a transverse rod 8 forming a hinge bearing for a gate 9 comprising a pair of cranked arms 10 pivotally mounted on the rod 8 and having a cross connecting member or barrier 11 at their outer ends.

The gate 9 is adapted to lie normally in a substantially horizontal position and is provided with suitable counterweights 12 for maintaining a suitable balance of the moving parts of the guard. Extending lengthwise between the side members 5 is a floating platform 13 which is pivotally connected at one end to a rod 14 extending between the counterweights 12 immediately below the rod 8 and at the other end to the free end of a pair of cranks 15 as at 16, which cranks are journalled upon a transverse rod 17 extending between the side members 5 adjacent the crossing end of the guard.

The radius of the cranks 15 is approximately equal to the curvature of the arcuate portion 7 of the adjacent end plate 6 and the corresponding end of the platform is curved to a similar radius as at 18 so that as the cranks are rocked downwardly about the rod 17 the curved end 18 of the platform will move substantially parallel to the curve of the arcuate portion 7 of the end plate 6, thus preventing the formation of any gap or opening between the two, in which stones may lodge, or an animal's hoof enter.

Having thus described the several parts of my invention I will now briefly explain its use.

Should an animal stray from the crossing and step onto one of the guards 3, a portion or the whole of his weight will be imposed upon the floating platform 13 adjacent its curved end 18 which will cause that portion to rock upon the cranks 15 and impart an endwise movement to the platform which movement will swing the gate arms 10 in an upward direction, thus disposing the gate 9 in an inclined position, such as would effectively prevent an animal from passing along the platform.

It will be obvious from the manner in which the platform is floated or suspended adjacent the gate end, that if an animal having obtained access to the right of way from a point remote from the crossing, should step onto the gate end of the crossing that no movement will be imparted to the platform or the gate, so that the animal may walk unobstructedly across the gate, but as soon as he has passed the gate, his weight will exert its influence upon the crossing end of the platform, causing that end to move in a downward direction and the entire platform to move endwise to raise the gate behind the animal, thus preventing his return.

The gate 9 when in normal position lies substantially level with the rails 1 so that a locomotive or other railway vehicle may pass freely thereover.

What I claim as my invention is:

1. A cattle guard for railways comprising a frame including an end plate having an arcuate inner curve, a platform having one end in substantial contact with said curve and operatively connected at the other end to a normally horizontal barrier said first named end being adapted to move about an axis as weight is applied thereto and to effect the raising of the barrier, said axis being common to the axis of the curve of the end plate.

2. A cattle guard for railways comprising a frame including transversely curved end plates, a platform having a curved end following the inner curve of one of said end plates and disposed in close proximity to the inner surface of said end plate, links mounting the curved end of the platform to support said end for movement in a curved path parallel to the inner curvature of the adjacent end plate, a barrier having its lower end pivoted to the frame adjacent the inner curve of the remaining end plate and means pivotally connecting the remaining end of the platform to the barrier below the pivotal point of said barrier.

Dated at Vancouver, B. C., this 14th day of April, 1927.

FRED LOCKETT.